United States Patent
Murayama et al.

(10) Patent No.: US 11,535,004 B2
(45) Date of Patent: *Dec. 27, 2022

(54) SOUNDPROOFING MATERIAL

(71) Applicant: NICHIAS CORPORATION, Tokyo (JP)

(72) Inventors: Kazutaka Murayama, Tokyo (JP); Keiji Tsukahara, Tokyo (JP); Hikari Sasaki, Tokyo (JP); Yuuma Tomitsuka, Tokyo (JP); Tatsuro Miki, Tokyo (JP); Daisuke Ando, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 899 days.

This patent is subject to a terminal disclaimer.

(21) Appl. No.: 16/305,173

(22) PCT Filed: May 24, 2017

(86) PCT No.: PCT/JP2017/019363
§ 371 (c)(1),
(2) Date: Nov. 28, 2018

(87) PCT Pub. No.: WO2017/208930
PCT Pub. Date: Dec. 7, 2017

(65) Prior Publication Data
US 2019/0329524 A1    Oct. 31, 2019

(30) Foreign Application Priority Data

Jun. 2, 2016  (JP) .............................. JP2016-111152

(51) Int. Cl.
 *B32B 5/18* (2006.01)
 *B32B 5/32* (2006.01)
(Continued)

(52) U.S. Cl.
CPC .................. *B32B 5/18* (2013.01); *B32B 5/32* (2013.01); *C03C 13/00* (2013.01); *C03C 17/001* (2013.01);
(Continued)

(58) Field of Classification Search
CPC ............... B32B 5/18; B32B 2255/102; B32B 2262/101; B32B 2307/102; B32B 2307/304; C04B 38/0054
See application file for complete search history.

(56) References Cited

U.S. PATENT DOCUMENTS 3,006,805 A * 10/1961 Waggoner ................. D21J 1/00
                                                    162/107
4,374,202 A    2/1983 Zucker et al.
(Continued)

FOREIGN PATENT DOCUMENTS

EP    3252026 A1    12/2017
FR    1447089 A     7/1966
(Continued)

OTHER PUBLICATIONS

Aug. 8, 2017 International Search Report issued in International Patent Application No. PCT/JP2017/019363.
(Continued)

*Primary Examiner* — Hai Vo
(74) *Attorney, Agent, or Firm* — Oliff PLC

(57) ABSTRACT

A soundproofing material including a porous body having a cell structure and including inorganic fibers other than asbestos, wherein an average cell diameter is more than 300 μm and 1000 μm or less, a bulk density is 0.007 to 0.024 g/cm³, and a flow resistivity is 170,000 to 2,000,000 Ns/m⁴.

8 Claims, 7 Drawing Sheets

(51) Int. Cl.
  *C03C 13/00* (2006.01)
  *C03C 17/00* (2006.01)
  *C04B 38/00* (2006.01)
  *C04B 38/10* (2006.01)
  *C04B 41/00* (2006.01)
  *G10K 11/162* (2006.01)

(52) U.S. Cl.
  CPC ...... *C04B 38/0054* (2013.01); *C04B 38/0067* (2013.01); *C04B 38/10* (2013.01); *C04B 41/009* (2013.01); *G10K 11/162* (2013.01); *B32B 2255/102* (2013.01); *B32B 2262/101* (2013.01); *B32B 2307/102* (2013.01); *B32B 2307/304* (2013.01); *B32B 2605/00* (2013.01); *C03C 2213/00* (2013.01); *C03C 2217/70* (2013.01)

(56) References Cited

U.S. PATENT DOCUMENTS

| | | | | |
|---|---|---|---|---|
| 5,277,955 | A * | 1/1994 | Schelhorn | B32B 27/12 |
| | | | | 428/220 |
| 5,983,586 | A * | 11/1999 | Berdan, II | E04B 1/7662 |
| | | | | 428/920 |
| 10,947,163 | B2 * | 3/2021 | Murayama | C04B 38/10 |
| 2002/0045040 | A1 | 4/2002 | Kanada et al. | |
| 2014/0273705 | A1 * | 9/2014 | Lawrence | B32B 5/245 |
| | | | | 442/370 |
| 2015/0034414 | A1 | 2/2015 | Arata et al. | |
| 2015/0118481 | A1 * | 4/2015 | Kodama | C08J 9/122 |
| | | | | 428/317.3 |
| 2018/0016195 | A1 | 1/2018 | Murayama et al. | |
| 2018/0126691 | A1 * | 5/2018 | Bush | B32B 5/022 |

FOREIGN PATENT DOCUMENTS

| | | | | |
|---|---|---|---|---|
| GB | 2133427 | A * | 7/1984 | ........... C04B 26/285 |
| JP | S60-141684 | A | 7/1985 | |
| JP | 2002-207487 | A | 7/2002 | |
| JP | 2007-211161 | A | 8/2007 | |
| JP | 2013-054379 | A | 3/2013 | |
| WO | WO-2013183662 | A1 * | 12/2013 | ................ C09J 7/26 |
| WO | 2014/006896 | A1 | 1/2014 | |
| WO | 2016/121400 | A1 | 8/2016 | |

OTHER PUBLICATIONS

Dec. 4, 2018 International Preliminary Reporton Patentability issued in International Patent Application No. PCT/JP2017/019363.
Nov. 25, 2019 Search Report issued in European Patent Application No. 17806487.9.
Sep. 5, 2022 Office Action cited in Chinese Patent Application No. CN201780034289.0.

* cited by examiner

SOUNDPROOFING MATERIAL

TECHNICAL FIELD

The invention relates to a soundproofing material comprising an inorganic fibrous porous body.

BACKGROUND ART

An inorganic fibrous foamed body is produced by a method in which an aqueous dispersion of inorganic fibers is foamed, and the resulting bubble-containing aqueous dispersion is shaped, followed by drying. The inorganic fibrous foamed body has elasticity similar to that of foamed polyurethane or foamed polyethylene, and is light, has excellent thermal insulation performance and sound absorbing property and is nonflammable, and hence it can be used as a heat-insulating element and/or a sound absorbing material for high-temperature portions of aircrafts, rockets, ships, automobiles, various other industrial equipment, etc.

As inorganic fibers used for the production of this type of foamed body, asbestos are most suitable due to its outstanding excellent properties in water dispersibility and entanglement properties. On the other hand, in recent years, due to environmental hygiene reasons, it became difficult to use asbestos, so that it is necessary to produce an elastic foamed body using inorganic fibers other than asbestos, even if they are difficult to use. In order to achieve this object, various proposals are made (Patent Document 1).

However, when inorganic fibers other than asbestos are used, dispersibility and entanglement properties are poor, and hence a foamed body produced are hard and have low resilience. Therefore, workability is poor, for example. There is room for improvement in terms of deformation characteristics such as flexibility and resiliency.

In recent years, suppression of the exterior noise from automobiles is required. In response to this, a soundproofing material is installed around equipment of automobiles. Preferably, such soundproofing material can be installed in a small interior space of an automobile, has heat resisting properties so as to withstand the heat of an engine and the like, and is light. In addition, a higher soundproofing property is required.

RELATED ART DOCUMENT

Patent Document

Patent Document 1: JP-A-S60-141684

SUMMARY OF INVENTION

An object of the invention is to provide a soundproofing material comprising a porous body having excellent deformation characteristics or a soundproofing material having excellent sound absorbing characteristics.

As a result of extensive studies, the inventors of the invention have found that a porous body having excellent deformation characteristics can be obtained without using asbestos as a raw material, and the invention has been attained based on this finding. The inventors of the invention have also found that cell diameters in foaming can be increased or decreased to adjust cell diameters, bulk density, and flow resistivity, and a soundproofing material having excellent sound absorbing characteristics can be consequently obtained, and the invention has been attained based on this finding.

According to the invention, a soundproofing material and the like having the following aspect is provided.

1. A soundproofing material comprising a porous body having a cell structure and comprising inorganic fibers other than asbestos, wherein an average cell diameter is more than 300 μm and 1000 μm or less, a bulk density is 0.007 to 0.024 g/cm$^3$, and a flow resistivity is 170,000 to 2,000,000 Ns/m$^4$.

2. A soundproofing material comprising a porous body, wherein the porous body comprises inorganic fibers other than asbestos, and has at least one properties selected from the following properties (1) to (8):

(1) all of compressive stresses when compressed at normal temperature at each compression ratio in a range of compression ratio of 0 to 90% are 1 MPa or less;

(2) the compressive stress when compressed at normal temperature at a compression ratio of 80% is 0.1 MPa or less;

(3) the recovery ratio when compressed at normal temperature at a compression ratio of 80% is 50% or more;

(4) all of the recovery ratios when compressed at normal temperature at each compression ratio in a range of compression ratio of 0 to 90% are 80% or more;

(5) the apparent Young's modulus when compressed at normal temperature at a compression ratio of 80% is 1 MPa or less;

(6) the apparent Young's modulus when compressed at normal temperature at a compression ratio of 80% is 0.05 MPa or less;

(7) the bulk density at normal temperature is 0.005 to 0.1 g/cm$^3$;

(8) a product [MPa·g/cm$^3$] of the bulk density and the compressive stress when compressed at normal temperature at a compression ratio of 40 to 80% is 0.3 or less; and (9) the product when compressed at normal temperature at a compression ratio of 80% is 0.005 or less.

3. The soundproofing material according to 1 or 2, wherein the inorganic fibers are glass fibers.

4. The soundproofing material according to 1, 2 or 3, further comprising a coating material coating at least a part of the surface of the porous body.

5. The soundproofing material according to any one of 1 to 4, wherein the porous body is a foamed body.

6. A method for producing a soundproofing material, comprising:

charging the surface of inorganic fibers negatively or positively;

stirring a dispersion containing the charged inorganic fibers and a surfactant to allow the dispersion to foam, thereby to obtain a wet foamed body;

drying the wet foamed body; and imparting a binder to the dried foamed body.

7. The method for producing a soundproofing material according to 6, wherein, when the surface of the inorganic fibers is negatively charged, a dispersion containing the charged inorganic fibers and a cationic surfactant is stirred to allow the dispersion to foam, thereby to obtain a wet foamed body, and when the surface of the inorganic fibers is positively charged, a dispersion containing the charged inorganic fibers and an anionic surfactant is stirred to allow the dispersion to foam, thereby to obtain a wet foamed body.

8. The method for producing a soundproofing material according to 6 or 7, wherein the surface of the inorganic fibers is negatively or positively charged by allowing the surface to contact with an alkaline or acidic treatment liquid.
9. The method for producing a soundproofing material according to 8, wherein the dispersion contains the treatment liquid, and the dispersion is allowed to foam by stirring while contacting with the treatment liquid.
10. The method for producing a soundproofing material according to 8 or 9, wherein the inorganic fibers are opened, dispersed and charged in the treatment liquid in advance.
11. The method for producing a soundproofing material according to any one of 6 to 10, wherein, after the wet foamed body is dried and before the binder is added, the wet foamed body is heated to remove the surfactant.
12. The method for producing a soundproofing material according to any one of 6 to 11, further comprising coating at least a part of the surface of the inorganic fibrous foamed body with a coating material.

According to the invention, a soundproofing material comprising a porous body having excellent deformation characteristics or a soundproofing material having excellent sound absorbing characteristics can be provided.

DESCRIPTION OF EMBODIMENTS

Figure 1:
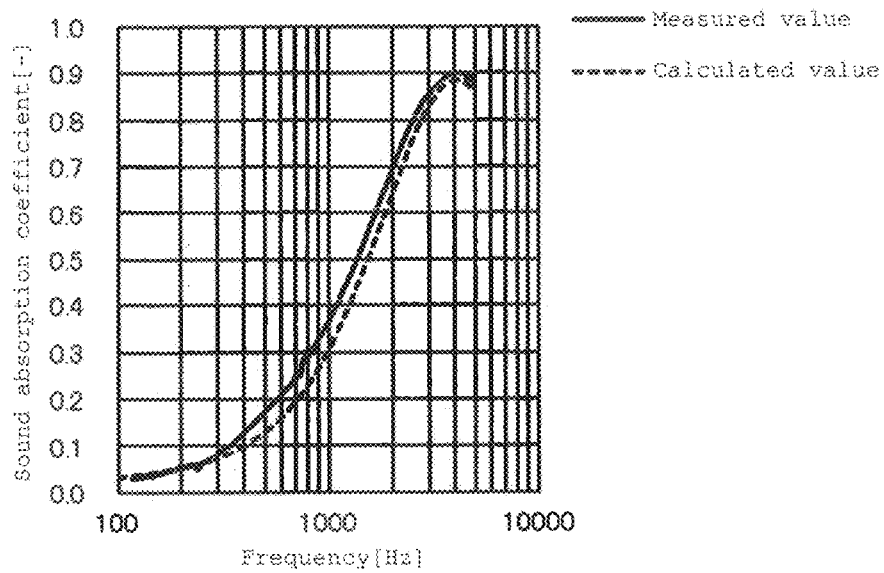
FIG. 1 is a graph showing consistency between predicted values and measured values of the sound absorption coefficient in an inorganic fibrous soundproofing material with bulk density and flow resistivity changed.

An embodiment of the soundproofing material according to a first aspect of the invention will be explained. The characteristics described below are characteristics at normal temperature unless otherwise indicated. The soundproofing material of this embodiment comprises, as a sound absorbing material, a porous body comprising inorganic fibers. This porous body has a cell structure. A foamed body may be used as the porous body.

The inorganic fibers used in the embodiment are configured without containing asbestos, and as the inorganic fibers, one or more selected from ceramic fibers, bio-soluble fibers (alkaline earth silicate fiber, rock wool, etc.) and glass fibers can be used.

For example, the bio-soluble inorganic fibers are inorganic fibers having a dissolution rate in a physiological saline solution at 40° C. of 1% or more.

The dissolution rate in a physiological saline solution is measured as follows, for example. Specifically, 1 g of a specimen prepared by grinding inorganic fibers to a dimension of 200 mesh or less and 150 ml of a physiological saline solution are put in a conical flask (volume: 300 mL). The conical flask is then placed in an incubator (40° C.). Horizontal vibrations (120 rpm) are continuously applied to the conical flask for 50 hours. The concentrations (mg/L) of elements, which may be main elements, e.g., silicon (Si), magnesium (Mg), calcium (Ca), sodium (Na), potassium (K) and aluminum (Al), contained in a filtrate obtained by filtration are each measured using an ICP optical emission spectrometer. The dissolution rate (%) in a physiological saline solution is calculated based on the concentrations of the elements thus measured and the contents (mass %) of the elements in the inorganic fibers before being dissolved. For example, when the measured elements are silicon (Si), magnesium (Mg), calcium (Ca), and aluminum (Al), the dissolution rate C (%) in a physiological saline solution is calculated by the following expression "C (%)=[amount (L) of filtrate×(a1+a2+a3+a4)×100]/[mass (mg) of inorganic fibers before being dissolved×(b1+b2+b3+b4)/100]". In the above expression, a1, a2, a3 and a4 respectively indicate the measured concentrations (mg/L) of silicon, magnesium, calcium, and aluminum, and b1, b2, b3 and b4 respectively indicate the contents (mass %) of silicon, magnesium, calcium, and aluminum in the inorganic fibers before being dissolved.

The bio-soluble fibers have the following composition, for example.

| | |
|---|---|
| Total of SiO$_2$, ZrO$_2$, Al$_2$O$_3$ and TiO$_2$ | 50 wt % to 82 wt % |
| Total of an alkali metal oxide and an alkaline earth metal oxide | 18 wt % to 50 wt % |

The bio-soluble fibers may have the following composition, for example.

| | |
|---|---|
| SiO$_2$ | 50 to 82 wt % |
| Total of CaO and MgO | 10 to 43 wt % |

Although the average fiber diameter is not limited, the fiber is preferably thin. For example, it can be 0.08 μm to 4.0

μm, 0.1 μm to 2.0 μm, or 0.2 μm to 1.0 μm. The average fiber diameter can be determined from the fiber diameters measured for 100 randomly selected fibers.

The porous body (foamed body and the like) used in this embodiment (hereinbelow, also referred to as a porous body of the embodiment) may comprise organic components such as a coupling agent in addition to inorganic components.

The porous body of the embodiment may be configured without containing an inorganic binder such as boron oxides, boron nitride, metal borides, and the like as an inorganic component. In this case, the porous body contains a coupling agent or the like.

The porous body of the embodiment may be configured without containing an organic binder as an organic component. In this case, the porous body contains an inorganic binder or the like. When an inorganic binder is used as the binder, the inorganic binder is not burnt down under high temperature conditions (for example, 450° C.) so that the bulk density, the compressive stress, and the compression recovery ratio can be maintained.

In the porous body of the embodiment, all of the compressive stresses when compressed at each compression ratio in a range of compression ratio of 0 to 90% at a normal temperature (5 to 35° C. according to JIS Z 8703) are preferably 2.0 MPa or less. For example, the compressive stress may be 1.5 MPa or less, 1.3 MPa or less, 1.0 MPa or less, 0.8 MPa or less, 0.6 MPa or less, 0.4 MPa or less, 0.2 MPa or less, 0.05 MPa or less, or 0.02 MPa or less. The lower limit is 0 MPa. More preferably, in the porous body of the embodiment, all of the compressive stresses when compressed at each compression ratio in a range of compression ratio of 0 to 90% at high temperature (450° C.) are 2.3 MPa or less. For example, the compressive stress may be 2.0 MPa or less, 1.7 MPa or less, 1.5 MPa or less, 1.3 MPa or less, 1.0 MPa or less, 0.8 MPa or less, 0.6 MPa or less, 0.4 MPa or less, 0.2 MPa or less, or 0.04 MPa or less. The lower limit is 0 MPa.

In the porous body of the embodiment, the compressive stress when compressed at a compression ratio of 80% at normal temperature (or all of the compressive stresses when compressed at each compression ratio in a range of compression ratio of 0 to 80%) is preferably 0.5 MPa or less. For example, the compressive stress is 0.3 MPa or less, 0.1 MPa or less, 0.08 MPa or less, 0.06 MPa or less, 0.04 MPa or less, 0.02 MPa or less, 0.01 MPa or less, 0.008 MPa or less, or 0.005 MPa or less. The lower limit is not limited, but it is normally 0.0001 MPa or more or 0.00001 MPa or more.

Here, in the porous body, when the bulk density and the compressive stress are respectively high, the porous body tends to be hard to have low resilience (restorability). On the contrary, in the porous body of the embodiment, as described above, since the compressive stresses when compressing at each compression ratio in a range of compression ratio of 0 to 90% are all low, the flexibility can be increased and the deformation characteristics can be improved. Therefore, for example, it can easily fit an attachment portion to which the porous body is attached, and the gap between the porous body and the attachment portion is suppressed, whereby the sealing properties (workability) can be improved. More specifically, such porous body can exhibit high flexibility from normal temperature to high temperature (e.g. 450° C.), the porous body can easily fits an attachment portion to which it is attached, and the gap between the porous body and the attachment portion is suppressed, whereby sealing properties from normal temperature to high temperature can be ensured and improved.

In the porous body of the embodiment, the apparent Young's modulus at a compression ratio of 40 to 80% at room temperature is preferably 0.7 MPa or less. For example, the apparent Young's modulus can be 0.6 MPa or less, 0.3 MPa or less, 0.1 MPa or less, 0.05 MPa or less, or 0.01 MPa or less. The lower limit is not restricted, but is normally 0.0001 MPa or more. More preferably, the apparent Young's modulus at a compression ratio of 40 to 80% at a high temperature (450° C.) is 0.8 MPa or less. For example, the apparent Young's modulus can be 0.6 MPa or less, 0.1 MPa or less, 0.08 MPa or less, or 0.05 MPa or less. The lower limit is not restricted, but is normally 0.0001 MPa or more. Further preferably, in the porous body of the embodiment, the apparent Young's modulus when compressed at each compression ratio in a range of compression ratio of 0 to 90% at normal temperature and high temperature (450° C.) is low as given above. As mentioned above, in the porous body of the embodiment, since the apparent Young's modulus is low, flexibility can be high and deformation characteristics can be improved.

Here, the apparent Young's modulus in the invention is a value obtained by dividing the compressive stress when compressed at a predetermined compression ratio by the above-mentioned prescribed compression ratio, assuming that the compression ratio is the amount of strain.

In the porous body of the embodiment, the apparent Young's modulus at normal temperature at a compression ratio of 80% is preferably 0.7 MPa or less. For example, the apparent Young's modulus can be 0.6 MPa or less, 0.3 MPa or less, 0.1 MPa or less, 0.05 MPa or less or 0.01 MPa or less. The lower limit is not restricted, but is normally 0.0001 MPa or more.

In the porous body of the embodiment, the bulk density (normal temperature, compression ratio 0%) is preferably 0.001 to 0.13 g/cm$^3$. For example, the bulk density can be 0.002 to 0.12 g/cm$^3$, 0.003 to 0.1 g/cm$^3$, 0.004 to 0.09 g/cm$^3$, 0.005 to 0.08 g/cm$^3$ or 0.006 to 0.05 g/cm$^3$. If the bulk density is within the above-mentioned range, the flexibility can be high, whereby the deformation characteristics can be improved.

In the porous body of this embodiment, the product [MPa·g/cm$^3$] of bulk density and compressive stress at a compression ratio of 40 to 80% or at a compression ratio of 80% is preferably 0.30 or less. More preferably, the above-mentioned product [MPa·g/cm$^3$] is 0.28 or less. For example, the product can be 0.1 or less, 0.05 or less, 0.01 or less, 0.001 or less, or 0.0005 or less. When the product [MPa·g/cm$^3$] of the bulk density and the compressive stress is low, the bulk density and the compressive stress of the porous body can be lowered, and the porous body not only is soft but also has high resilience.

In the porous body of the embodiment, the average circle equivalent diameter of the pore diameter is preferably 150 μm to 1000 μm. For example, the circle equivalent diameter of the pore diameter can be 180 μm to 800 μm, 200 μm to 700 μm, or 250 μm to 600 μm. When the average circle equivalent diameter of the pore diameter is within the above range, the recovering force after compression is secured (In other words, the compression recovery ratio is ensured and adjusted) while maintaining the structural strength, whereby the sealing property can be ensured and improved. Further, since the average circle equivalent diameter of the pore diameter is small, it is possible to suppress heat conduction by convection and thereby to improve the heat insulating property, as well as to improve sealing performance by increasing the pressure loss. The average circle equivalent diameter of the pore diameter can be adjusted by the foaming magnification, the amount of bubbles, the bubble diameter, and the like, when produced by foaming.

The compressive stress, the bulk density, the apparent Young's modulus, and the average circle equivalent diameter can be adjusted (controlled) by, for example, the surface active treatment method for inorganic fibers, the concentration (content ratio) of inorganic fibers, the foaming magnification, the amount of bubbles, the bubble diameter, and the like in the method for producing a foamed body described later.

The porous body of the embodiment preferably has a recovery ratio of 50% or more when compressed at a compression ratio of 80% (preferably 0 to 90%) at normal temperature. For example, the recovery ratio can be 60%, 70%, 80% or more, 85% or more, 90% or more, or 95% or more. The upper limit is not limited, but is normally 99% or less. More preferably, the recovery ratio when compressed at a compression ratio of 80% (preferably 0 to 90%) at high temperature (450° C.) is 50% or more. For example, the recovery ratio can be 60%, 70%, 80% or more, 85% or more, 90% or more, or 95% or more. The upper limit is not limited, but is normally 99% or less.

Preferably, the porous body of the embodiment has a recovery ratio of 87% or more (more preferably 90% or more) at normal temperature when compressed at a compression ratio of 40%. The upper limit is not limited, but it is normally 99% or less.

With such a porous body, since the recovery ratio is high, the recovering property can be enhanced and the deformation characteristics can be improved. More specifically, the porous body can easily fits an attachment portion to which the porous body is attached and the gap between the porous body and the attachment portion can be suppressed to ensure and improve the sealing property from normal temperature to high temperature.

The porous body can possess the above-mentioned properties in an arbitrary combination. The porous body also has an excellent heat insulating property.

The porous body as mentioned above can be produced by forming air bubbles by the method described later for production. The porous body of the above embodiment can be configured not to contain fluoromica or gum arabic that promotes bubble formation. As a different embodiment, it is also possible to configure the porous body such that it comprises fluoromica or gum arabic.

Next, the soundproofing material (porous body) of the above embodiment can be produced by the following method. The production method includes production of an inorganic fibrous foamed body, and the production method of the foamed body comprises a preparation step of preparing an inorganic fiber dispersion, a foaming step of foaming the inorganic fiber dispersion, a dehydration step of drying the foamed body (step of removing a dispersion medium), and a binder imparting step of imparting a binder. In a case where a residual surfactant worsens the reaction of the binder, in order to promote adhesion of the binder, a firing step in which the foamed body is fired at a prescribed temperature may be added prior to the binder imparting step. The method for producing the soundproofing material may comprise a step of stacking an additional layer on the foamed body or coating the foamed body with an additional layer. The binder may be put in the dispersion for foaming in advance and the heat treatment may be conducted after preparing a foamed body.

One embodiment of the preparation step includes a charging step of bringing the surface of the inorganic fiber into contact with an alkaline or acidic treatment liquid to make the surface of the inorganic fiber to be negatively or positively charged and a surfactant addition step of adding a surfactant to the charged inorganic fiber to prepare a dispersion. When the surface of the inorganic fiber is negatively charged, it is preferable to add a cationic surfactant or when the surface of the inorganic fiber is positively charged, it is preferable to add an anionic surfactant.

In the charging step, by adjusting pH by using an alkaline or acidic treating liquid, the zeta potential of the surface of the inorganic fiber is controlled. Specifically, the zeta potential of the surface of the inorganic fiber is allowed to be negative or positive.

In the surfactant adding step, preferably, a surfactant having a hydrophilic group with an opposite sign to that of the charged inorganic fibers is added to the fibers, and the hydrophilic group of the surfactant is adsorbed on the surface of the inorganic fiber to cause a hydrophobic group to be disposed on the side opposite to the surface of the inorganic fiber, thereby to render the inorganic fiber (outermost surface) hydrophobic. When foaming is conducted by introducing air in the foaming step mentioned later in a state that the surface of the inorganic fiber is hydrophobic by absorbing the surfactant as mentioned above, formation of bubbles is promoted on the hydrophobic group side in the surface of the inorganic fiber, whereby a foamed body in a good foamed state can be obtained. In other words, by controlling the zeta potential of the surface of the inorganic fiber, a surfactant is interacted with the inorganic fiber to render the fiber hydrophobic and thus bubbles easily adhere to around the inorganic fiber for forming a foamed body (spongy structure).

For the inorganic fibers, ceramic fibers, bio-soluble fibers (alkaline earth silicate fibers, rock wool, etc.), glass fibers or the like can be used. The treatment liquid may be any one as long as it can be dissolved in water to change pH. An acid or a base of an inorganic compound, or an acid or a base of an organic compound can be used. For example, the zeta potential of the surface of the inorganic fiber shows a value that is not zero, such as −5 mV to −70 mV, −7 mV to −60 mV, −10 mV to −45 mV, +5 mV to +65 mV, +7 mV to +60 mV or +10 mV to +45 mV. Since the pH value to achieve a predetermined zeta potential varies depending on the type of fiber, the pH value cannot be uniquely specified. However, when fibers which have zeta potential of zero at a pH value of 7 (pH value at isoelectric point is 7) are used, negative charging is possible at a pH value of higher than 7, and positive charging is possible at a pH value of lower than 7, for example. For example, when fibers which have zeta potential of zero at a pH value of 2 (pH value at isoelectric point is 2) are used, negative charging is possible at a pH value of higher than 2, and positive charging is possible at a pH value of lower than 2. The zeta potential can be obtained by dispersing the fibers in an aqueous dispersion medium adjusted to have a predetermined pH and measuring by using a general-purpose zeta potential meter (for example, Model FPA, manufactured by AFG Analytik).

The charging step and the surfactant-addition step in the preparation step can be carried out periodically or simultaneously. When the charging step and the surfactant-addition step are simultaneously conducted, the treatment liquid, the inorganic fiber and the surfactant can be mixed together. On the other hand, when the charging step and the surfactant-addition step are carried out periodically, the inorganic fibers can be opened, dispersed and charged in advance in the treatment liquid, and then mixed with a surfactant. Further, in another embodiment of the preparing step, without using a surfactant, a dispersion can be prepared by putting inorganic fibers having their surfaces at least hydrophobized by a surface treatment with an amphiphilic substance, a silane coupling agent having a hydrophobic functional group, a titanium coupling agent having a hydrophobic functional group or the like in a dispersion liquid (dispersion medium). The coupling agent in this step is used for bringing the inorganic fibers into a hydrophobic state to form a foamed body. The coupling agent used in the later binder imparting step is for preventing the form of the foamed body from collapsing due to wetting with water.

The amount of the surfactant in the dispersion can be appropriately adjusted depending on the inorganic fiber, but for example, the surfactant may be used in an amount of 0.01 to 1.0 parts by weight relative to 100 parts by weight of the glass fiber. The amount of the surfactant can preferably be 0.1 to 0.8 parts by weight, more preferably 0.2 to 0.7 parts by weight. If the amount of the surfactant is too small, the surface of the inorganic fiber cannot be sufficiently rendered hydrophobic and the foaming property may be lowered. On the other hand, if the amount of the surfactant is too large, the surfactants adhere to each other, and the surface of the inorganic fiber may not be sufficiently hydrophobized. The amount of surfactant can be adjusted in this view point.

Also, the dispersion may be composed without containing organic binders (resin emulsion, rubber (elastomer) component (gum arabic etc.)) or magnesium oxide or hydroxide.

In the foaming step, air (air bubbles) is (are) supplied from a bubble supplying device to the inorganic fiber dispersion liquid in which the treatment liquid, the inorganic fibers, and the surfactant are mixed, thereby to allow the dispersion to foam. Air (air bubbles) may be supplied to the inorganic fiber dispersion liquid by stirring, thereby to allow the dispersion to foam without using a bubble supplying device. By such a bubble supplying device or stirring, foaming magnification, bubble amount, and bubble diameter can be adjusted.

In the dehydrating step, the foamed body is dehydrated by drying (including natural drying) the dispersion medium contained in the dispersion at normal temperature or a prescribed temperature other than normal temperature for a predetermined time (for example, 4 hours).

In the firing step, the foamed body is fired at a high temperature (for example, 450° C.) to remove the surfactant. The firing step can be carried out simultaneously with the dehydration step.

A binder with which fibers are bind to each other may be used as a binder used in the binder imparting step, and examples thereof include a coupling agent, an inorganic binder, and the like. When a coupling agent is used, the foamed body, the coupling agent, and water vapor are reacted to allow the foamed body to be imparted with the coupling agent. Specifically, vapor generated by heating the coupling agent is adhered to the foamed body, and allow the foamed body to react with water vapor. By treating with water vapor, the coupling agent is hydrolyzed, condensed by dehydration, and adheres to the foamed body. For example, the foamed body and the vapor of the coupling agent are brought into contact with each other in a closed container (airtight container into which no gas is mixed from the outside but the inside pressure can be increased by heating the inside). After contacting, water is put in the closed container to allow water vapor to be generated, and the water vapor is allowed to be reacted with a coupling agent. When a large amount of a coupling agent is imparted, instead of or in addition to the above-mentioned treatment, heating may be conducted after impregnating the foamed body directly with the coupling agent. Thereafter, the foamed body is in contact with water vapor.

Examples of the inorganic binder include $SiO_2$-based binders ($SiO_2$ particles, liquid glass (sodium silicate)), $Al_2O_3$-based binders ($Al_2O_3$ particles, basic acid aluminum such as polyaluminum chloride), phosphates, (synthetic or natural) clay minerals, and the like.

Examples of the coupling agent include a silane coupling agent and a titanium coupling agent. Methyltriethoxysilane and the like can be given as a silane coupling agent.

The amount of the binder can be appropriately adjusted depending on the inorganic fiber, but it is about 1 to 10 wt %, for example.

The porous body may essentially consist of or consist of inorganic fibers, a surfactant and a binder; or may essentially consist of or consist of inorganic fibers and a binder. The "essentially consist of" means that these are 95 wt % or more, 98 wt % or more or 99 wt % or more of the porous body.

Next, an embodiment of the soundproofing material according to a second aspect of the invention will be explained.

The soundproofing material of this embodiment comprises a porous body having a cell structure composed of inorganic fibers.

Figure 2:
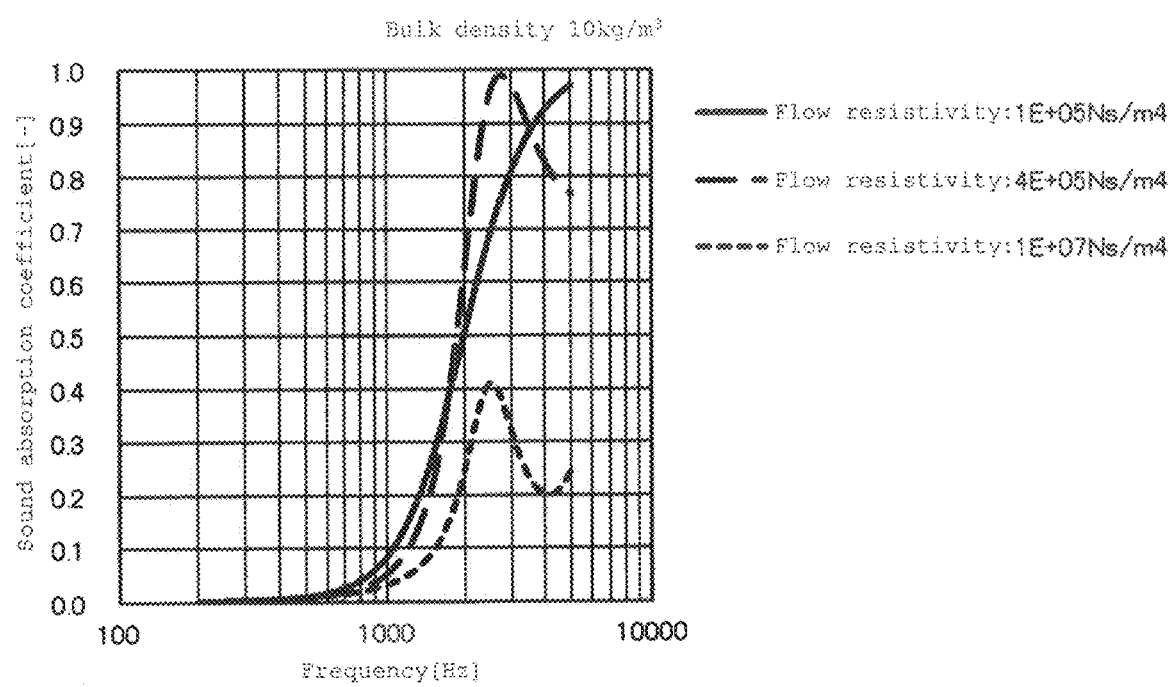
FIG. 2 is a graph showing the relation between the flow resistivity and the sound absorption coefficient when the bulk density is 10 kg/m$^3$.
Figure 3:
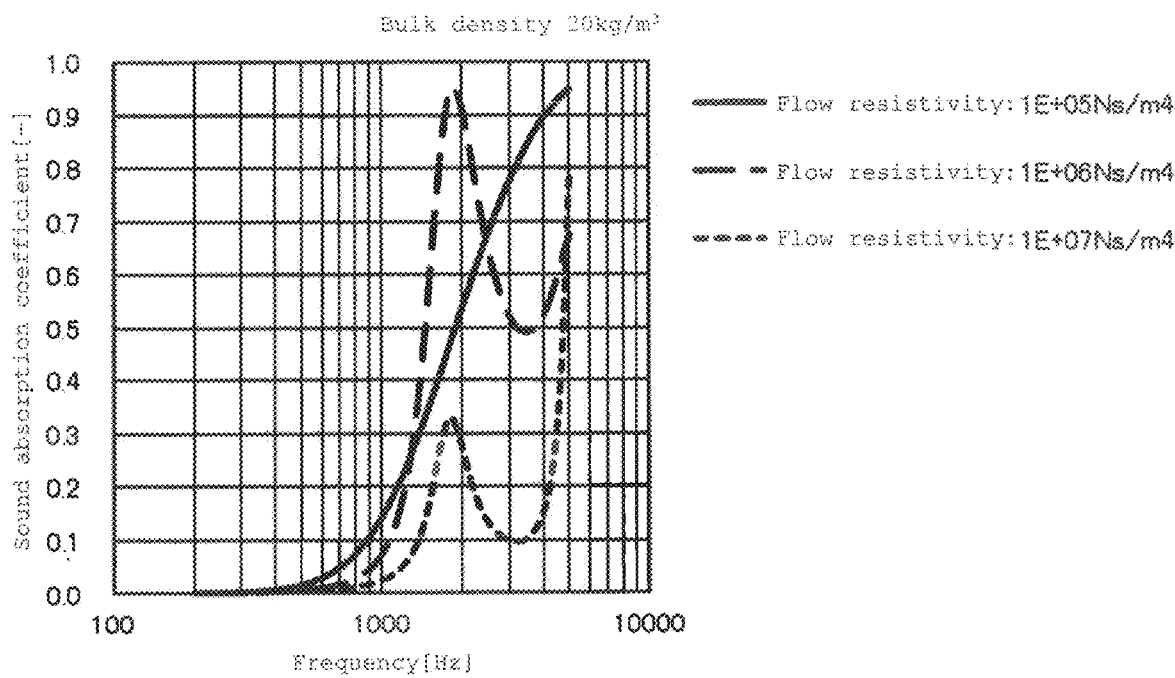
FIG. 3 is a graph showing the relation between the flow resistivity and the sound absorption coefficient when the bulk density is 20 kg/m$^3$.
Figure 4:
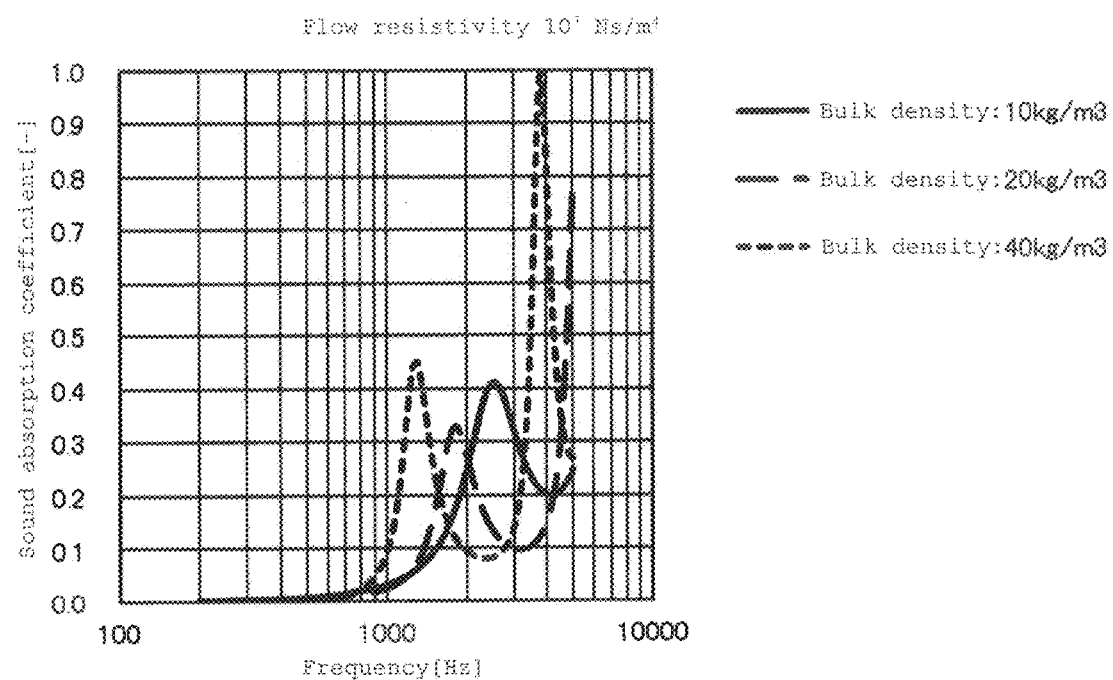
FIG. 4 is a graph showing the relation between the bulk density and the sound absorption coefficient when the flow resistivity is $1 \times 10^7$ Ns/m$^4$.

It is known that the sound absorption coefficient of a fibrous soundproofing material can be predicted using Limp frame model (R. Panneton, Journal of Acoustical Society of America, Vol. 122, Issue 6(2007)), which is one of equivalent fluid models. The sound absorption coefficient of a soundproofing material is defined by seven Biot parameters in Limp frame model. The parameters intricately influence each other, however, it was confirmed that flow resistivity and bulk density have large influence out of the Biot parameters in an inorganic fibrous soundproofing material. Specifically, sound absorption coefficients calculated based on Biot model (calculated values) and sound absorption coefficients obtained from measurements on an actually produced soundproofing material (measured values) are compared while changing the flow resistivity and the bulk density. The results are shown in FIG. 1. It is shown from FIG. 1 that the calculated values and the measured values are highly correlated. Calculation results of sound absorption coefficients with a constant bulk density of 10 kg/m$^3$ or 20 kg/m$^3$ and with flow resistivity changed are shown in FIGS. 2 and 3. Incidentally, "aE+b" means "a×10$^b$." Calculation results of sound absorption coefficients with a constant flow resistivity of 1×10$^7$ Ns/m$^4$ and with a bulk density changed are shown in FIG. 4. It is shown that the curve shape of the sound absorption coefficient significantly varies according to the change in values of the flow resistivity and the bulk density. In FIGS. 2 and 3, the sound absorption coefficient is highest at a flow resistivity of 4×10$^5$ Ns/m$^4$ when the bulk density is 10 kg/m$^3$. The sound absorption coefficient is highest at a flow resistivity of 1×10$^6$ Ns/m$^4$ when the bulk density is 20 kg/m$^3$. These results show that flow resistivity has an appropriate value. It is further shown from FIG. 4 that when the bulk density increases, the high sound absorption coefficient shifts to a lower frequency.

From the above, a high sound absorption coefficient at low frequency can be obtained by increasing the bulk density while maintaining the flow resistivity at the appropriate value, for example. However, flow resistivity is normally proportional to bulk density as shown in Bies equation (see FIG. 5). The flow resistivity increases with increasing the bulk density.

Figure 5:
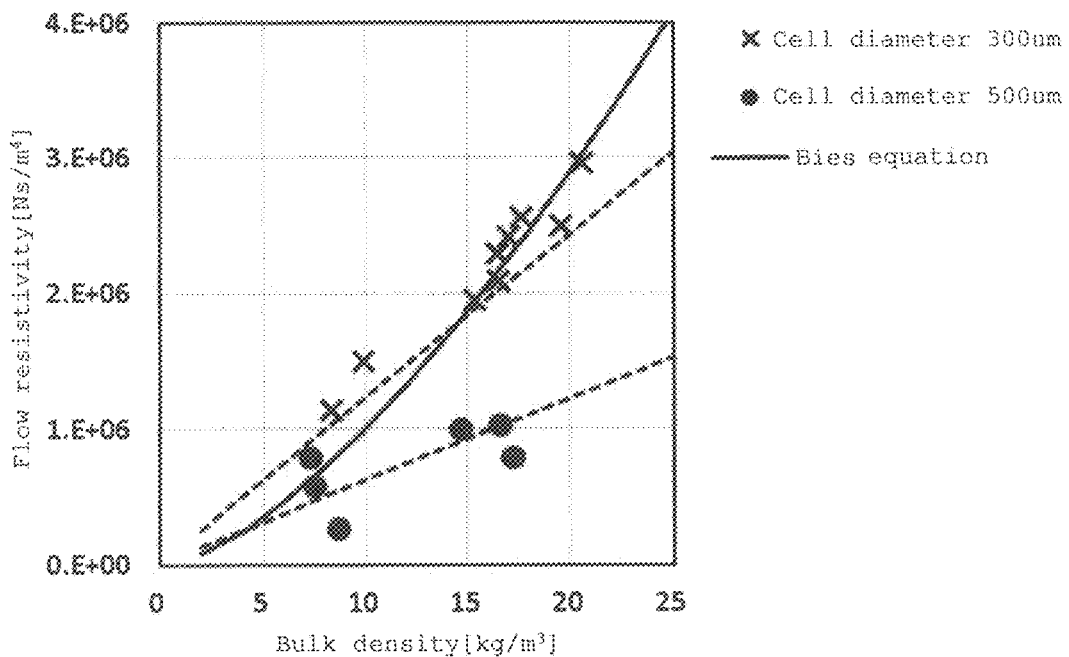
FIG. 5 is a graph showing the relations between the flow resistivity and the bulk density in a soundproofing material having a cell structure and in a soundproofing material without a cell structure.

The inventors of the invention have found that when the cell diameters are adjusted, the flow resistivity increases not so much as in a conventional manner with increasing the bulk density. Measured values of the bulk density and the flow resistivity when the cell diameters are 0.3 mm and 0.5 mm are shown in FIG. 5. The solid line shows the relation between the bulk density and the flow resistivity in a soundproofing material without a cell structure, with the relation based on the conventional Bies equation. That is, the flow resistivity increases with increasing the bulk density. On the other hand, in the sound proofing material having a cell structure, when the cell diameter is 0.3 μm or 0.5 μm, the bulk density and the flow resistivity have a relation different from that based on Bies equation. That is, the flow resistivity can be changed by +20 to −50% by adjusting the cell diameter. Cells are surrounded by cell walls of inorganic fibers. Accordingly, it is thought that the bulk density of a porous body with a cell structure is determined by the thickness of the cell walls. That is, in this aspect, a soundproofing material having bulk density and flow resistivity suitable for obtaining a high sound absorption coefficient can be obtained by adjusting the cell diameter.

Based on the above findings, the soundproofing material of this aspect comprises a porous body having a cell structure comprising inorganic fibers, and has the following properties.

Average cell diameter: more than 300 μm and 1000 μm or less

Bulk density: 7 to 24 kg/m$^3$

Flow resistivity: 170,000 to 2,000,000 Ns/m$^4$

The average cell diameter may be 400 to 1000 μm. The bulk density may be 10 to 20 kg/m$^3$.

For example, when the bulk density is 10 kg/m$^3$, a cell diameter of 0.50 to 1.0 mm is preferable, and a cell diameter of 0.70 to 1.0 mm is more preferable at a frequency of 3000 to 5000 Hz. When the bulk density is 14 kg/m$^3$, a cell diameter of 0.50 to 1.0 mm is preferable, and a cell diameter of 0.70 to 1.0 mm is more preferable at a frequency of 2000 to 5000 Hz. When the bulk density is 20 kg/m$^3$, a cell diameter of 0.50 to 1.0 mm is preferable, and a cell diameter of 0.70 to 1.0 mm is more preferable at a frequency of 1000 to 4000 Hz.

Figure 6:
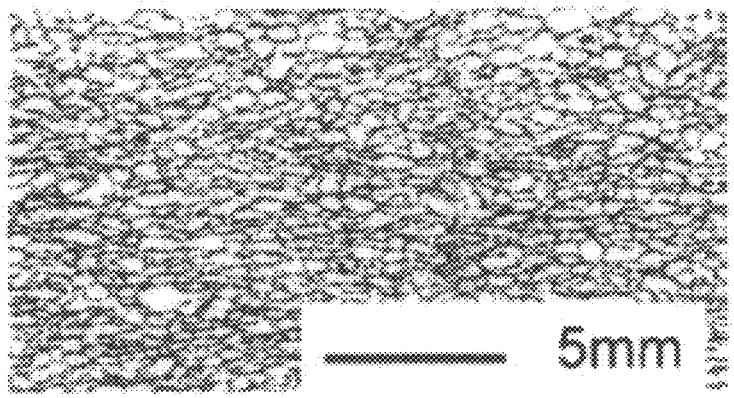
FIG. 6 is a cross-sectional view showing an example of the cross section of a cell structure.
Figure 7:
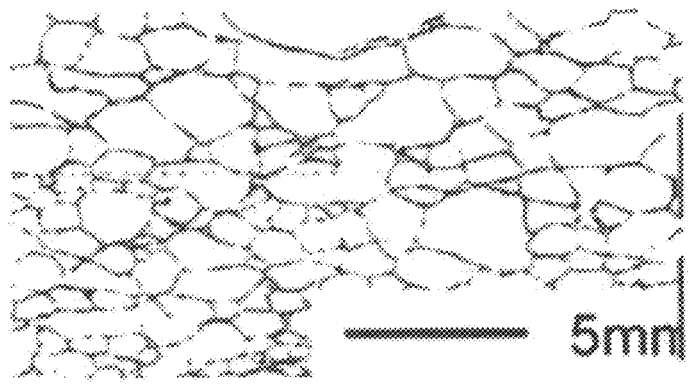
FIG. 7 is a cross-sectional view showing another example of the cross section of the cell structure.

The average cell diameter, the bulk density, and the flow resistivity can be measured according to the method described in Example 6. FIGS. 6 and 7 show cell structures. The cell structure is a structure in which pores and cell walls surrounding the pores are connected in large numbers. The average cell diameter of the cell structure in FIG. 6 is smaller than the average cell diameter of the cell structure in FIG. 7.

The soundproofing material of this aspect is light, and comprises a fiber dense part and a space part (cells), providing an excellent sound absorbing performance.

Preferable structures and characteristics of the inorganic fibers and the cell structure (porous body) used in this aspect are the same as those of the soundproofing material according to the first aspect described above.

The soundproofing material of this aspect can be produced according to the same method as the soundproofing material according to the first aspect described above. In the foaming step, air (air bubbles) is (are) supplied from a bubble supplying device to the inorganic fiber dispersion containing the treating liquid, the inorganic fibers, and the surfactant to allow the dispersion to foam, and the cell diameter can be adjusted by adjusting a bubble diameter by the bubble supplying device.

The soundproofing material of the invention may be composed only of the porous body, but may comprise an additional layer having an appropriate function. The additional layer may coat a part or all of the surface of the porous body or may be stacked on the porous body. Examples of the additional layer include a sound insulation layer, a sound absorbing layer, a dust production suppressing layer, and an adhesive layer, and the additional layer may have multiple functions. Hereinbelow, an example of the soundproofing material comprising the additional layer will be described with reference to the drawings.

Figure 8:
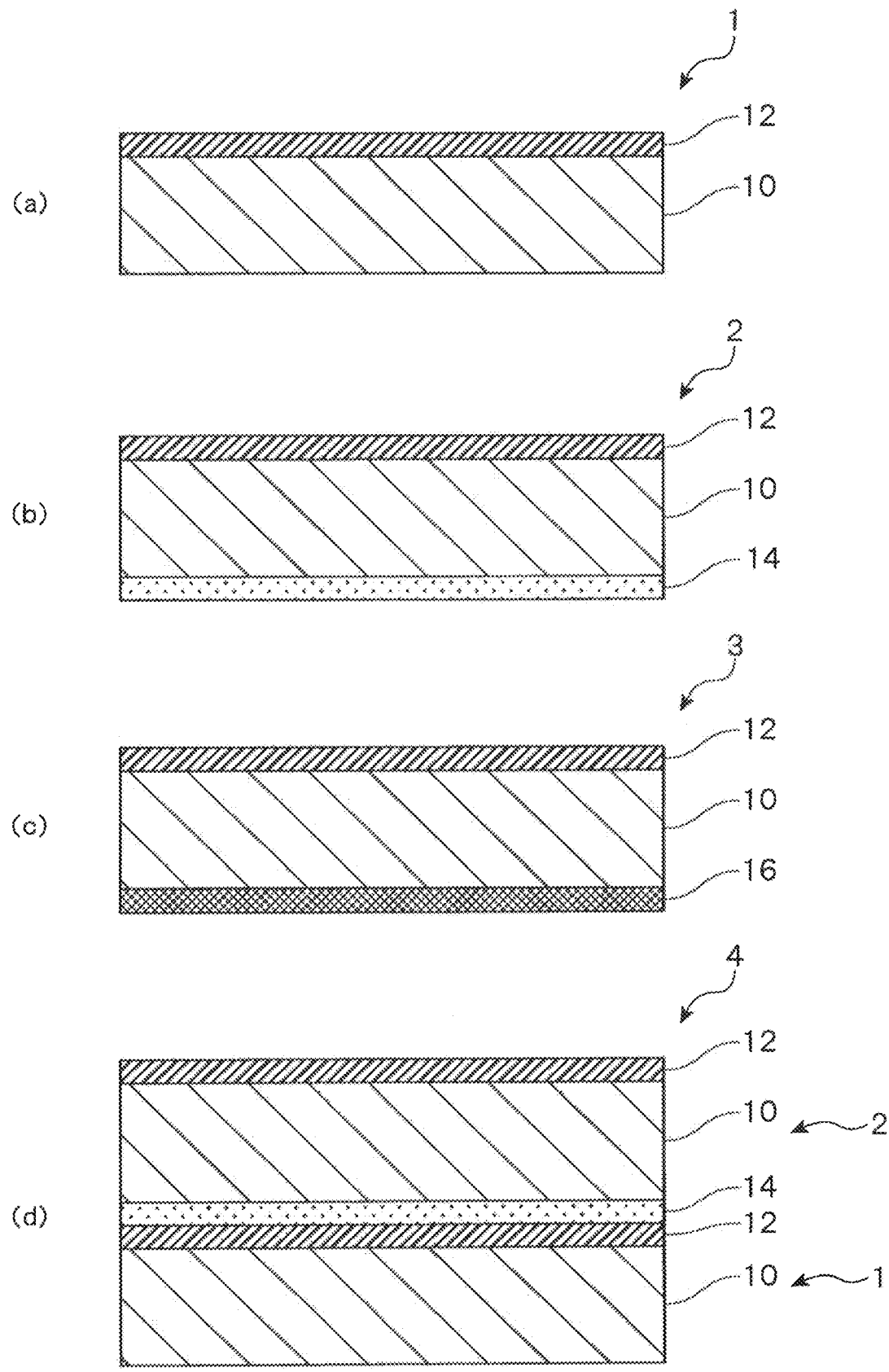
FIG. 8 is a schematic cross-sectional view of soundproofing materials according to an embodiment of the invention.

A soundproofing material 1 shown in FIG. 8(a) is provided with a sound insulation layer 12 at one surface of the porous body (sound absorbing material) 10, with the sound insulation layer 12 coating or stacked on the porous body 10. The sound insulation layer 12 may be a soft layer such as a resin film and a glass cloth and may be a hard layer such as a metal plate (for example, a SUS plate and an aluminum plate).

A soundproofing material 2 shown in FIG. 8(b) is provided with the sound insulation layer 12 at one surface of the porous body 10 and provided with another sound absorbing layer 14 at the opposing other surface. The sound absorbing layer 14 is composed of a porous body, a foam material, or the like made of a fibrous material to further improve sound absorbing characteristics.

A soundproofing material 3 shown in FIG. 8(c) is provided with the sound insulation layer 12 at one surface of the porous body 10 and provided with a dust production suppressing layer 16 at the opposing other surface. The dust production suppressing layer 16 is composed of fibrous nonwoven fabric, a glass cloth, metal foil, a metal plate, or the like.

A laminate of two or more layers of the same or different soundproof materials may be used as the soundproofing material. For example, a soundproofing material 4 shown in FIG. 8(d) is a stack of the soundproofing material 1 shown in FIG. 8(a) and the soundproofing material 2 shown in FIG. 8(b).

In the step of stacking the additional layer on the porous body or coating the porous body with the additional layer, the additional layer may be stacked with an adhesive or a coating material may be heated to be stacked by welding.

EXAMPLES

Hereinbelow, specific examples will be given. The invention is not limited to these examples.

Example 1

The micro glass fibers (average fiber diameter: 0.4 μm) were treated by adjusting the zeta potential of the fiber surface to be −55 mv by dispersing them in aqueous ammonia of pH 10 such that the concentration thereof became 0.5 wt %. Subsequently, 0.5 parts by weight (in terms of solid matter of surfactant) of a cationic surfactant (lauryltrimethylammonium chloride (trade name: QUARTAMIN 24P, manufactured by Kao Corporation)) was added relative to 100 parts by weight of the fiber, followed by mixing and stirring. At this time, air was incorporated to allow the dispersion to foam. The thus obtained wet foamed body was dried and treated at 450° C. for 1 hour in an electric furnace to remove the surfactant adhering to the foamed body. Next, a coupling agent was imparted. As a coupling agent, methyltriethoxysilane (trade name: KBE-13, manufactured by Shin-Etsu Chemical Co., Ltd.) was used. A silane coupling agent was placed in a sealed container and heated to about 160° C. to allow vapor of the silane coupling agent to be generated, and the foamed body was treated with the vapor for 4 hours. Next, in order to proceed the reaction of the coupling agent, 8 g of water was added into the closed container to allow water vapor to be generated, and the foamed body was treated for 2 hours. Further, in the closed container, a coupling agent of about 10 g per 1 g of the foamed body weight was directly applied and heated at 105° C. for 4 hours. Thereafter, in the same manner as mentioned above, water in an amount corresponding to half the mass of the coupling agent was placed in the container and treated at 105° C. for 2 hours. The average equivalent circle diameter of the foamed body pore diameter at room temperature (20° C.) in an uncompressed state was about 0.25 mm.

Figure 9:
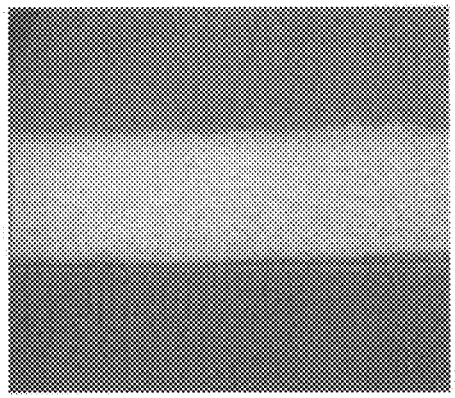
FIG. 9 is a photograph showing the cross section of a foamed body (soundproofing material) obtained in Example 1.

A photograph of a cross section of the obtained foamed body (a soundproofing material) is shown in FIG. 9. The foamed body was evaluated for the following evaluation items. The results are shown in Table 1. In addition to the following evaluation items, the thus obtained foamed body was also excellent in terms of thermal conductivity (heat insulating property) and sound absorbing property.

(1) Product of Bulk Density and Compressive Stress

Calculation was conducted by multiplying the following bulk density and the compressive stress.

(a) Bulk Density

A sample was cut out from the prepared porous body and the dimensions, i.e. the length, the width and the height, were measured by using a dimension measuring device (e.g. a caliper). Next, the weight of the sample was measured and the bulk density was measured by the following equation:

Bulk density (g/cm$^3$)=weight÷length÷width÷height (b) Compressive Stress

As shown by the following equation, compressive stress was calculated by dividing a load value with which a sample was compressed in the test by the area (length and width) obtained by the sample dimension measurement. The load value was obtained as follows. The dimension of a sample was measured as in the case of the bulk density mentioned above, and 0 to 90% of compression ratio was set relative to 100% of the measured thickness. The load at the time of compression was a load value with which the sample was compressed to a certain thickness (2 mm/min) by using a material testing machine (Autograph, manufactured by Shimadzu Corporation).

Compression stress N/m$^2$=measured load (N)÷area of sample (m$^2$)

(2) Recovery Ratio

The dimension of the sample was measured in the same manner as in the case of the bulk density as mentioned above. The compression ratio (0 to 90%) was set taking the thickness of this sample as 100%, and the sample was compressed (2 mm/min) to a prescribed thickness by using a material testing machine (Autograph, manufactured by Shimadzu Corporation). The thickness of the sample after the completion of the test was measured, and the recovery ratio was calculated from the following equation:

Recovery ratio (%)=Thickness after compression test÷Thickness before compression test×100

(3) Circle Equivalent Diameter of Pore Diameter

A sample was cut out from the prepared foamed body and the cross section was photographed at a magnification of 20 by using a microscope (MODEL KH2200 manufactured by Hirox Corporation). All pores (12 to 332) in the photograph taken were measured by an image analysis software ImageProPlus (manufactured by Media Cybernetics, Inc.). In the measurement, since the portion recognized as a pore was in an elliptical shape, the long diameter and the short diameter of the pore were measured, and the cross sectional area was calculated by the following equation:

Cross sectional area of pore=long diameter÷2×short diameter÷2×π

In addition, the diameter corresponding to a diameter of a perfect circle was calculated from the cross-sectional area as a circle equivalent diameter by the following equation. Then, the average of circle equivalent diameters of all the pores in the photograph was calculated.

Circle equivalent pore diameter=2×√(cross sectional area of pore÷π)

The average circle equivalent diameter is an arithmetic average pore diameter obtained by the following equation.

Arithmetic average pore diameter=$\Sigma_1^n d \div n$ (In the equation, d is a circle equivalent diameter, and n is the number of pores.)

(4) Apparent Young's Modulus

An apparent Young's modulus was calculated based on the compressive stress and the amount of strain measured by the sample dimension measurement.

(5) Sealing Property

A sample was prepared by punching the foamed body into a ring having an inner diameter of 15 mm and an outer diameter of 30 mm. The sample and spacer were disposed between a pair of holding parts, and clamped by bolts such that the sample had a thickness corresponding to a prescribed compression ratio (0 to 90%). $N_2$ gas was flown from a $N_2$ cylinder into one inside of the pair of holding parts such that the gas penetrated the sample with 20 kPa of gas pressure adjusted by a differential pressure gauge. The flow amount of the $N_2$ gas in the system was measured by a flow meter installed in the other inside of the pair of holding parts. The flow amount of the $N_2$ gas thus measured was taken as the quantity L/min·mm of $N_2$ gas leaked from another cross section of the holding parts.

Example 2

Ceramic fibers (alumina about 50 wt %, silica about 50 wt %) (average fiber diameter: 2.0 μm) were treated by adjusting the zeta potential of the fiber surface to be −32 mV by dispersing them in aqueous ammonia of pH 10 such that the concentration thereof became 2 wt %. Subsequently, 0.5 parts by weight (in terms of solid matter of surfactant) of a cationic surfactant (lauryltrimethylammonium chloride (trade name: QUARTAMIN 24P, manufactured by Kao Corporation)) was added relative to 100 parts by weight of the fiber, followed by mixing and stirring. At this time, air was incorporated to allow the dispersion to foam. The resulting foamed body was subjected to drying, firing and coupling agent imparting treatment in the same manner as in Example 1. The average circle equivalent diameter of the pore diameter of the foamed body at normal temperature in a non-compression state was about 0.53 mm. For the resulting foamed body, evaluation was conducted in the same manner as in Example 1. The results are shown in Table 2.

Example 3

A foamed body was prepared and evaluated in the same manner as in Example 1, except that an anionic surfactant (sodium laurylbenzenesulfonate (trade name: NEOPEREX G65, manufactured by Kao Corporation)) was used instead of the cationic surfactant. The results are shown in Table 3.

Example 4

A foamed body was prepared and evaluated in the same manner as in Example 2, except that an anionic surfactant (sodium laurylbenzenesulfonate (trade name: NEOPEREX G65, manufactured by Kao Corporation)) was used instead of the cationic surfactant. The results are shown in Table 4.

Comparative Example 1

A dispersion of fibers was prepared in the same manner as in Example 1. The dispersion was then subjected to dehydration and drying without conducting zeta potential adjustment on the fiber surface and foaming. The average circle equivalent diameter of the pore diameter of the resulting un-foamed body (not compressed at normal temperature) was about 143 μm.

Figure 10:
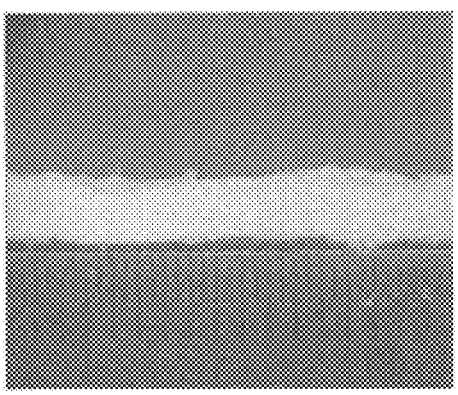
FIG. 10 is a photograph showing the cross section of a foamed body (soundproofing material) obtained in Comparative Example 1.

The photograph of the cross section of the resulting un-foamed body is shown in FIG. 10. Further, for the un-foamed body, evaluation was conducted in the same manner as in Example 1. The results are shown in Table 5.

Comparative Example 2

A foamed body was prepared in the same manner as in Example 1, except that no coupling agent was imparted. The resulting foamed body was brittle, and hence could not be evaluated.

TABLE 1

| | Example 1 Normal temperature | | | | | |
|---|---|---|---|---|---|---|
| Compression ratio (%) | Bulk density (g/cm³) | Compressive stress (Pa) | Bulk density × Compressive stress (MPa · g/cm³) | Recovery ratio (%) | Apparent Young's modulus (Pa) | Sealing property at 20 kPa (L/min · mm) |
| 0 | 0.008 | 0 | 0 | 100 | — | 30.1 |
| 20 | 0.010 | 1,414 | $1.4 \times 10^5$ | 97.8 | 7,070 | 28.8 |
| 40 | 0.016 | 1,840 | $2.9 \times 10^5$ | 92.3 | 4,599 | 25.7 |
| 60 | 0.024 | 2,203 | $5.3 \times 10^5$ | 95.1 | 3,671 | 20.2 |
| 80 | 0.050 | 4,036 | $2.0 \times 10^4$ | 96.6 | 5,045 | 14.7 |
| 90 | 0.100 | 13,253 | $1.3 \times 10^3$ | 93.2 | 14,725 | 4.1 |

| | Example 1 At the time of heating at 450° C. | | | | | |
|---|---|---|---|---|---|---|
| Compression ratio (%) | Bulk density (g/cm³) | Compressive stress (Pa) | Bulk density × Compressive stress (MPa · g/cm³) | Recovery ratio (%) | Apparent Young's modulus (Pa) | Sealing property at 20 kPa (L/min · mm) |
| 0 | 0.010 | 0 | 0 | 100 | — | 28.4 |
| 20 | 0.014 | 1,998 | $2.8 \times 10^6$ | 96.8 | 9,980 | 22.1 |
| 40 | 0.024 | 3,494 | $8.4 \times 10^5$ | 95.9 | 8,735 | 20.4 |
| 60 | 0.041 | 5,544 | $2.3 \times 10^4$ | 95.5 | 9,240 | 16.5 |
| 80 | 0.073 | 12,573 | $9.2 \times 10^4$ | 95.7 | 15,716 | 9.5 |
| 90 | 0.168 | 44,332 | $7.4 \times 10^3$ | 91.1 | 49,258 | 3.8 |

TABLE 2

| | Example 2 | | | | | | | |
|---|---|---|---|---|---|---|---|---|
| | Normal temperature | | | | At the time of heating at 450° C. | | | |
| Compression ratio (%) | Bulk density (g/cm³) | Compressive stress (Pa) | Bulk density × Compressive stress (MPa · g/cm³) | Apparent Young's modulus (Pa) | Bulk density (g/cm³) | Compressive stress (Pa) | Bulk density × Compressive stress (MPa · g/cm³) | Apparent Young's modulus (Pa) |
| 0 | 0.054 | 0 | 0 | — | 0.051 | — | — | — |
| 20 | — | — | — | — | — | — | — | — |
| 40 | 0.101 | 3,605 | $3.6 \times 10^{-4}$ | 9,013 | 0.104 | 4,037 | $4.2 \times 10^{-4}$ | 10,091 |
| 60 | 0.131 | 7,214 | $9.5 \times 10^{-4}$ | 12,024 | 0.142 | 8,105 | $1.2 \times 10^{-3}$ | 13,509 |
| 80 | 0.250 | 36,181 | $9.0 \times 10^{-3}$ | 45,226 | 0.285 | 49,779 | $1.4 \times 10^{-2}$ | 62,224 |
| 90 | 0.517 | 457,363 | $2.4 \times 10^{-1}$ | 508,181 | 0.500 | 546,184 | $2.7 \times 10^{-1}$ | 606,871 |

TABLE 3

Example 3
Normal temperature

| Compression ratio (%) | Bulk density (g/cm$^3$) | Compressive stress (Pa) | Bulk density × Compressive stress (MPa · g/cm$^3$) | Apparent Young's modulus (Pa) | Recovery ratio (%) |
|---|---|---|---|---|---|
| 0 | — | — | — | — | — |
| 20 | — | — | — | — | — |
| 40 | 0.044 | 4,180 | $1.8 \times 10^{-4}$ | 10,450 | 91.4 |
| 60 | 0.066 | 7,762 | $5.1 \times 10^{-4}$ | 12,937 | 79.7 |
| 80 | 0.131 | 40,649 | $5.3 \times 10^{-3}$ | 50,812 | 73.3 |
| 90 | 0.262 | 165,719 | $4.3 \times 10^{-2}$ | 184,132 | — |

TABLE 4

Example 4
Normal temperature

| Compression ratio (%) | Bulk density (g/cm$^3$) | Compressive stress (Pa) | Bulk density × Compressive stress (MPa · g/cm$^3$) | Apparent Young's modulus (Pa) | Recovery ratio (%) |
|---|---|---|---|---|---|
| 0 | — | — | — | — | — |
| 20 | — | — | — | — | — |
| 40 | 0.075 | 4,442 | $3.3 \times 10^{-4}$ | 11,106 | 88.6 |
| 60 | 0.113 | 12,267 | $1.4 \times 10^{-3}$ | 20,445 | 80.1 |
| 80 | 0.225 | 82,495 | $1.9 \times 10^{-2}$ | 103,118 | 55.2 |
| 90 | — | — | — | — | — |

TABLE 5

Comparative Example 1
Normal temperature

| Compression ratio (%) | Bulk density (g/cm$^3$) | Compressive stress (Pa) | Bulk density × Compressive stress (MPa · g/cm$^3$) | Recovery ratio (%) | Apparent Young's modulus (Pa) | Sealing property at 20 kPa (L/min · mm) |
|---|---|---|---|---|---|---|
| 0 | 0.146 | 0 | 0 | 100 | — | 33.1 |
| 20 | 0.161 | 6,211 | $1.0 \times 10^{-3}$ | 92.8 | 31,055 | 30.5 |
| 40 | 0.178 | 27,912 | $5.0 \times 10^{-3}$ | 84.7 | 69,780 | 25.1 |
| 60 | 0.267 | 77,467 | $2.1 \times 10^{-2}$ | 90.1 | 128,778 | 22 |
| 80 | 0.534 | 613,321 | $3.3 \times 10^{-1}$ | 85.0 | 766,651 | 19.8 |
| 90 | 1.069 | 2,155,794 | 2.3 | 75.8 | 2,395,327 | 13.7 |

Comparative Example 1
At the time of heating at 450° C.

| Compression ratio (%) | Bulk density (g/cm$^3$) | Compressive stress (Pa) | Bulk density × Compressive stress (MPa · g/cm$^3$) | Recovery ratio (%) | Apparent Young's modulus (Pa) | Sealing property at 20 kPa (L/min · mm) |
|---|---|---|---|---|---|---|
| 0 | 0.106 | 0 | 0 | 100 | — | 35.7 |
| 20 | 0.124 | 7,731 | $9.6 \times 10^{-2}$ | 93.4 | 38,655 | 32.1 |
| 40 | 0.162 | 35,269 | $5.7 \times 10^{-3}$ | 89.6 | 88,172 | 28.9 |
| 60 | 0.220 | 87,894 | $1.9 \times 10^{-2}$ | 88.8 | 146,489 | 25.7 |
| 80 | 0.478 | 721,650 | $3.4 \times 10^{-1}$ | 83.1 | 902,062 | 22.6 |
| 90 | 1.026 | 2,427,337 | 2.5 | 77.1 | 2,697,041 | 15.8 |

Example 5

A foamed body (bulk density: 10 kg/m$^3$) was prepared in the same manner as in Example 1, except that the micro glass fibers were dispersed in an acetic acid solution of pH 3 (concentration: 0.3 wt %) to adjust the zeta potential to −38 mV, and trimethylsilane ($CH_3SiO_{3/2}$) was used as a coupling agent in Example 1.

Figure 11:
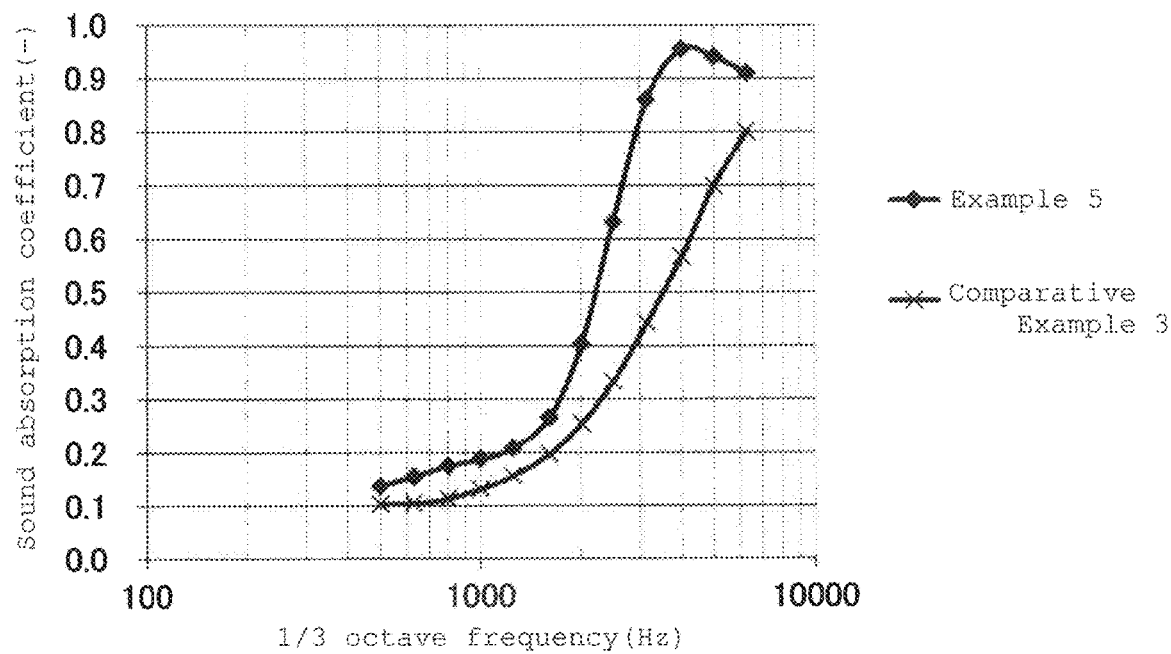
FIG. 11 is a graph showing sound absorption coefficients of foamed bodies (soundproofing materials) obtained in Example 5 and Comparative Example 3.

A sample with a diameter of 29 mm and a thickness of 10 mm for sound absorption coefficient evaluation was cut out from the obtained foamed body using a $CO_2$ laser processing machine (LASER MAN A-2 by Comax Inc.). Sound absorption coefficients were measured according to JIS A 1405-2 (normal incident sound absorption coefficient, without back air layer) using a sound absorption coefficient measuring system (a measuring system by Brüel & Kjar) (sound absorption coefficient measuring system: software: MS1021, acoustic tube: Type 4206, power amplifier: Type 4206, PULSE: front end). The results are shown in FIG. 11.

Comparative Example 3

The same acetic acid dispersion as Example 5 containing the micro glass fibers and the cationic surfactant was treated without being foamed unlike Example 5 by adjusting the dispersion volume of the fibers in water so that the bulk density became 10 kg/m³ and dried by freezing at −10° C. and sublimating water under vacuum (about 10 Pa). Thereafter, heating to remove the surfactant and a coupling agent treatment were performed in the same manner as in Example 5 to prepare a mat-shape not-spongy structure body (non-foamed body) (bulk density: 10 kg/m³). Sound absorption coefficients were measured in the same manner as in Example 5. The results are shown in FIG. 11.

Example 6

A foamed body was obtained in the same manner as in Example 1, except that foamed bodies with different cell diameters were obtained by using a nozzle in the foaming step and changing the size of bubbles from the nozzle in Example 1.

Figure 12:
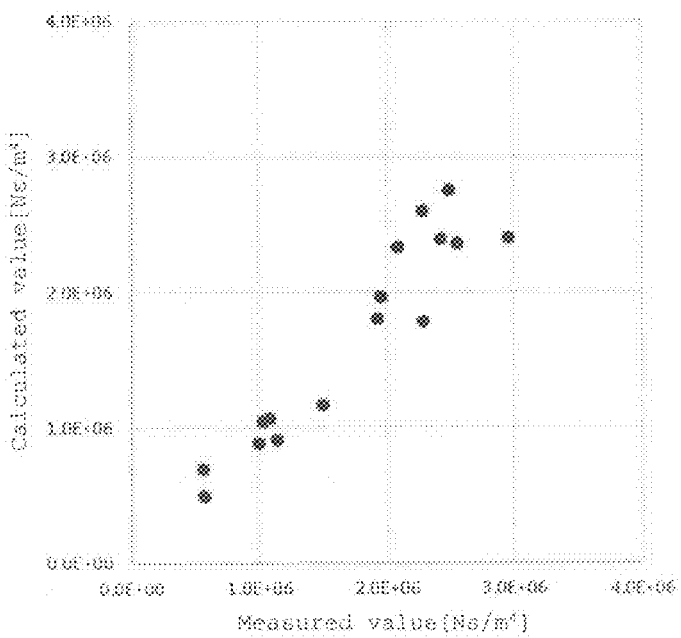
FIG. 12 is a graph showing consistency between predicted values and measured values of the flow resistivity in an inorganic fibrous soundproofing material.
Figure 13:
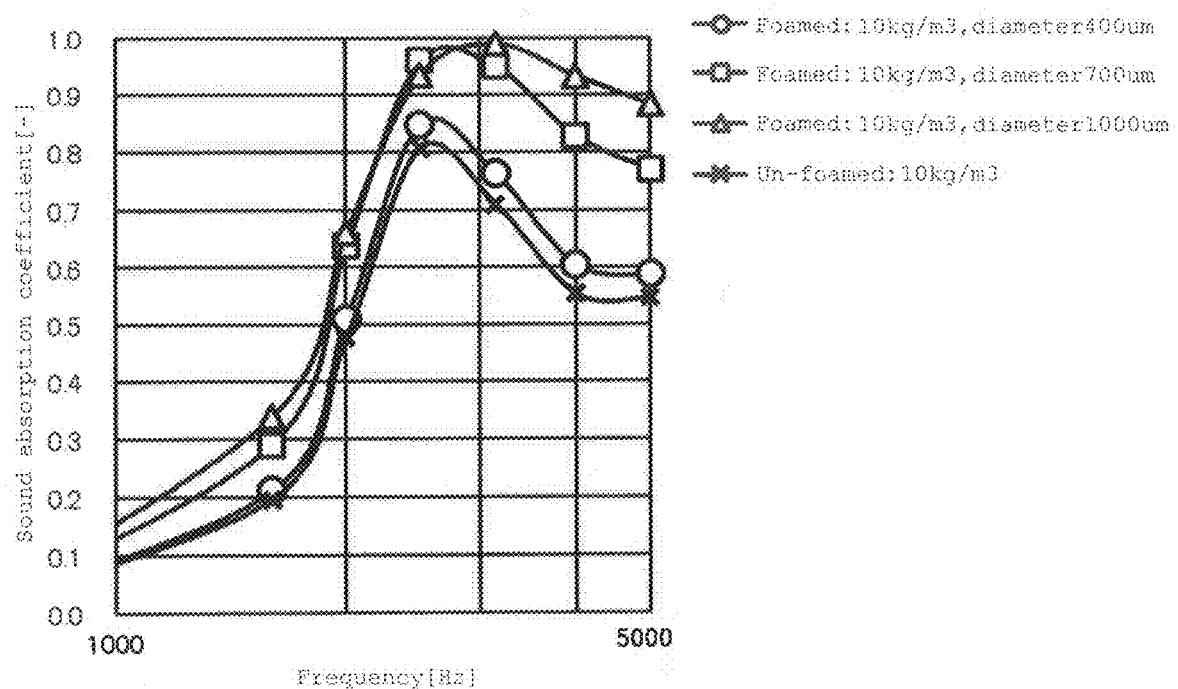
FIG. 13 is a graph showing the relation between cell diameters and sound absorption coefficients when the bulk density is 10 kg/m$^3$.
Figure 14:
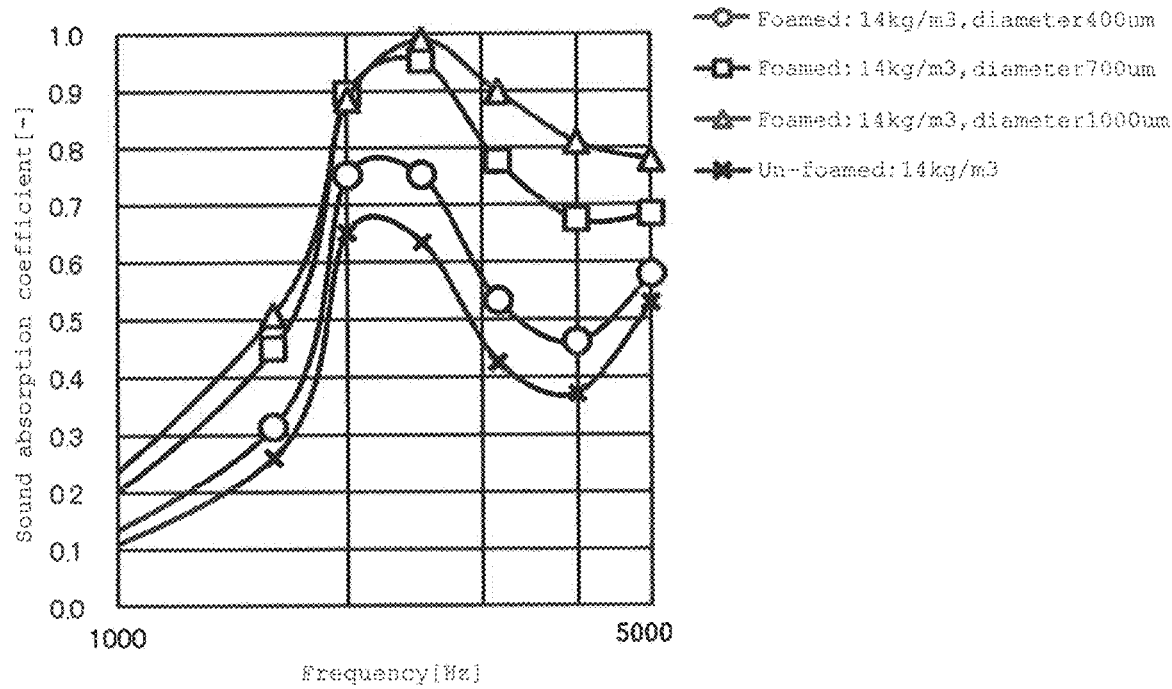
FIG. 14 is a graph showing the relation between cell diameters and sound absorption coefficients when the bulk density is 14 kg/m$^3$.
Figure 15:
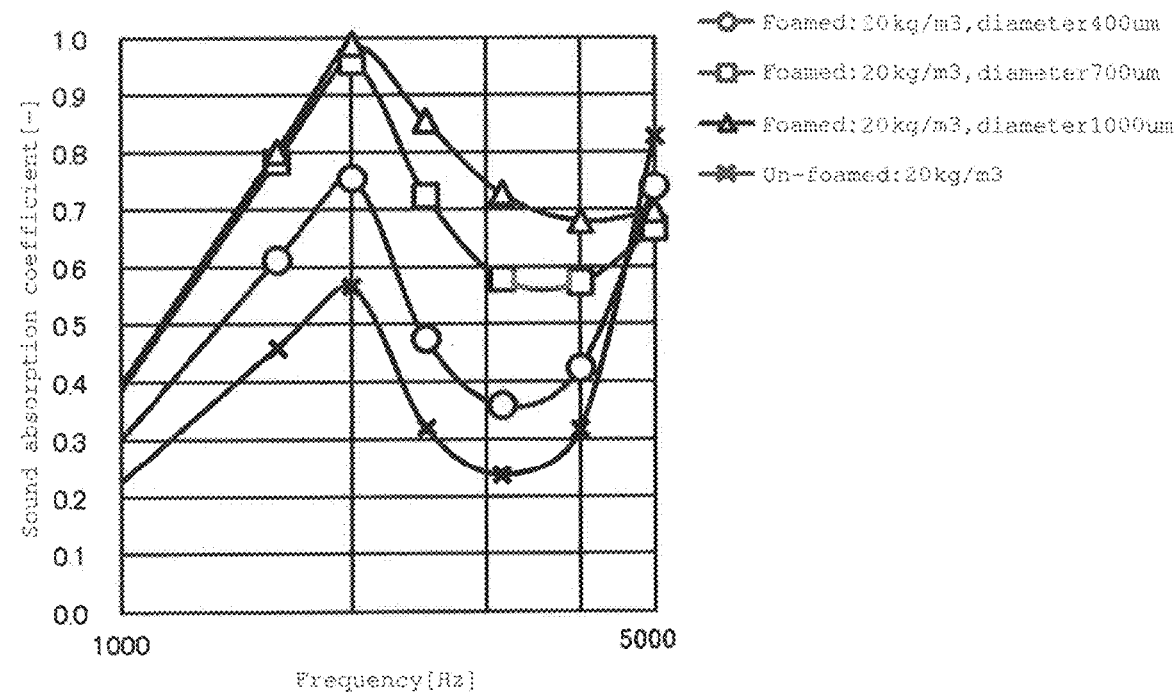
FIG. 15 is a graph showing the relation between cell diameters and sound absorption coefficients when the bulk density is 20 kg/m$^3$.

The obtained foamed bodies were evaluated for the following evaluation items. Measurements of flow resistivity were performed at an average cell diameter of 270 to 510 μm and a bulk density of 6.8 to 20.6 kg/m³. The results are shown in Table 6. A equation between cell diameters and bulk density was delivered from the measurement results of the flow resistivity. The equation is shown below. Each of the coefficients C1, C2, C3 in the equation was determined from the measurement results using multiple regression analysis. Calculated values of the flow resistivity are also shown in Table 6. The relation between measured values and calculated values of the flow resistivity is shown in FIG. 12.

$$\sigma = C1 \times \rho^{C2} \times D^{C3}$$

wherein σ is flow resistivity [Ns/m⁴], ρ is bulk density [kg/m³] of the soundproofing material, D is a cell diameter [m], and coefficients C1, C2, C3 are 2.49, 0.98, −1.34. It was shown from FIG. 12 that the calculated values of the flow resistivity well predict the measured values. Sound absorption coefficients at an average cell diameter of 400 to 1000 μm and a bulk density of 10 to 20 kg/m³ were calculated from the flow resistivity calculated by the above equation. The results are shown in FIGS. 13 to 15. It is shown that the foamed bodies have excellent sound absorption coefficients. Specifically, It is shown from FIG. 13 that the sound absorption coefficient improves at a frequency range of 3000 to 5000 Hz when the bulk density is 10 kg/m³ and when the cell diameter is 0.70 to 1.0 mm. It is shown from FIG. 14 that the sound absorption coefficient improves at a frequency range of 2000 to 5000 Hz when the bulk density is 14 kg/m³ and when the cell diameter is 0.70 to 1.0 mm. It is shown from FIG. 15 that the sound absorption coefficient improves at a frequency range of 1000 to 4000 Hz when the bulk density is 20 kg/m³ and when the cell diameter is 0.70 to 1.0 mm.

Average Cell Diameter (Average Circle Equivalent Diameter)

A sample was cut out from the prepared foamed body and an X-ray transmission image was taken at a resolution of 5 μm/pixel using an X-ray Micro-CT scanner (SkyScan1272 manufactured by Bruker Corporation). A three-dimensional image was synthesized from the taken X-ray transmission image using attached software (NRrecon and DATA-VIEWER) to form a cross section image of the inside of the sample. All pores in the obtained cross section image were measured in the same manner as in Example 1 and the average of circle equivalent diameters was calculated.

Bulk Density

Bulk density was measured in the same manner as in Example 1.

Flow Resistivity

Flow resistivity is a Biot parameter representing the opposition to air flow in the soundproofing material. A measurement on the flow resistivity is performed by measuring a differential pressure between the front and the rear of the soundproofing material with air flowing therethrough, and the flow resistivity can be obtained from the following equation.

$$\sigma = \Delta P / (V \cdot L)$$

wherein σ is flow resistivity [N·s/m⁴] of the material, V is an air flow velocity (m/s) in the material, ΔP is a differential pressure (Pa) between the front and the rear of the material, and L is a thickness (m) of the material.

The flow resistivity can be, for example, measured by a flow resistivity measurement apparatus (product name: Air-ReSys, Nihon Onkyo Engineering, Co., Ltd.).

Sound Absorption Coefficient

It is well known that Limp frame model (R. Panneton, Journal of Acoustical Society of America, Vol. 122, Issue 6 (2007)), which is one of equivalent fluid models, is useful for predictive calculation of sound absorption coefficient of fibrous soundproofing material. Hence, the sound absorption coefficient was calculated using Limp frame model. The equations are shown below.

$$\alpha_0 = 1 - \left| \frac{Z_0 - \rho_0 c_0}{Z_0 + \rho_0 c_0} \right|^2$$

$$Z_0 = Z_c \coth(\Gamma \cdot L)$$

$$\Gamma = j\omega \sqrt{\rho_{eff}/K_f}$$

$$Z_c = \sqrt{\rho_{eff} K_f}$$

$$K_f = \frac{\gamma P_e}{\gamma - (\gamma - 1)\left[1 + \frac{8\mu}{j\Lambda'^2 B^1 \omega \rho_0} \sqrt{1 + j\rho_0 \frac{\omega B^2 \Lambda'^2}{16\eta}}\right]^{-1}}$$

$$\rho_{eff} = \frac{\tilde{\rho}_{eq} M - \rho_0^2}{M + \tilde{\rho}_{eq} - 2\rho_0}$$

$$M = \rho + \phi \rho_0$$

$$\phi = 1 - \frac{\rho}{\rho_2}$$

$$\tilde{\rho}_{eq} = \frac{\rho_0 \alpha_\infty}{\phi}\left(1 - j\frac{\sigma\phi}{\omega\rho_0\alpha_\infty}\sqrt{1 + j\frac{4\alpha_\infty^2 \eta \rho_0}{\sigma^2 \phi^2 \Lambda^2}\omega}\right),$$

wherein $\alpha_0$ is a normal incident sound absorption coefficient of a soundproofing material placed on the rigid wall, $Z_0$ is acoustic impedance of a soundproofing material placed on the rigid wall, $Z_c$ is characteristic impedance of a soundproofing material, Γ is a propagation constant of a soundproofing material, L is a thickness of a soundproofing material, ω is angular velocity of an acoustic wave, $\rho_{eff}$ is effective density in a soundproofing material, Kr is an effective bulk modulus in a soundproofing material, φ is porosity, σ is the flow resistivity of a soundproofing material, Λ is a viscous characteristic length of a soundproofing material, Λ' is a thermal characteristic length of a soundproofing material, α is tortuosity of a soundproofing material and is approximately 1 in the case of fibrous soundproofing material, ρ is the bulk density of a soundproofing material, $\rho_s$ is true density of fibers of a soundproofing material, B² is the Prandtl number for air and is 0.71, η is the viscosity of air and is $1.84 \times 10^{-5}$ [Ns/m²], $\rho_0$ is the density of air and is 1.2 [kg/m³], $c_0$ is the speed of sound in air and is 342 [m/s], γ is the specific heat ratio of air and is 1.4, $P_0$ is a pressure of air and is $1.013 \times 10^5$ [Pa] assuming ordinary pressure, and j is the imaginary unit.

The thermal characteristic length Λ' is defined by the following equation.

$$\frac{2}{\Lambda'} = \frac{A}{V}$$

wherein A is a surface area of fibers in a soundproofing material, and V is a volume of air in a soundproofing material. When a soundproofing material is composed of only fibers, it is rewritten as follows using a fiber diameter d.

$$\Lambda' = \frac{d}{2} \frac{\phi}{1-\phi}$$

As for the viscous characteristic length Λ, the following Allard equation was used.

$$\Lambda = \frac{\Lambda'}{2}$$

TABLE 6

| Sample No. | Bulk density [kg/m³] | Average cell diameter [μm] | Flow resistivity [Ns/m⁴] Measured value | Flow resistivity [Ns/m⁴] Calculated value |
|---|---|---|---|---|
| 1 | 6.8 | 350 | 5.7E+05 | 6.9E+05 |
| 2 | 7.5 | 480 | 5.8E+05 | 5.0E+05 |
| 3 | 8.3 | 330 | 1.1E+06 | 9.1E+05 |
| 4 | 9.9 | 310 | 1.5E+06 | 1.2E+06 |
| 5 | 14.1 | 430 | 1.1E+06 | 1.1E+06 |
| 6 | 14.6 | 510 | 1.0E+06 | 8.8E+05 |
| 7 | 15.3 | 290 | 2.0E+06 | 2.0E+06 |
| 8 | 16.5 | 330 | 2.3E+06 | 1.8E+06 |
| 9 | 16.5 | 270 | 2.1E+06 | 2.3E+06 |
| 10 | 16.5 | 490 | 1.0E+06 | 1.0E+06 |
| 11 | 17.0 | 270 | 2.4E+06 | 2.4E+06 |
| 12 | 17.4 | 340 | 1.9E+06 | 1.8E+06 |
| 13 | 17.5 | 260 | 2.3E+06 | 2.6E+06 |
| 14 | 17.6 | 280 | 2.6E+06 | 2.4E+06 |
| 15 | 19.5 | 270 | 2.5E+06 | 2.7E+06 |
| 16 | 20.6 | 310 | 3.0E+06 | 2.4E+06 |

Comparative Example 4

A non-foamed body having no cell structure was produced in the same manner as in Comparative Example 3 so that bulk density became 10, 14, and 20 kg/m³. Calculated values of their sound absorption coefficients are also shown in FIGS. 13 to 15. Flow resistivity was calculated according to Bies equation shown below.

$$\sigma = 3.19 \times 10^{-9} \times \rho^{1.53} \times d^{-2}$$

wherein σ is flow resistivity [Ns/m⁴], ρ is bulk density [kg/m³] of a soundproofing material, and d is a fiber diameter [m].

INDUSTRIAL APPLICABILITY

The soundproofing material of the invention can be used for transport machinery such as an automobile, for example. The soundproofing material of the invention can be used in a high temperature environment with vibrations such as an engine periphery of an automobile, for example.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The specification of Japanese application(s) on the basis of which the present application claims Paris convention priority is incorporated herein by reference in its entirety.

The invention claimed is:

1. A soundproofing material which is an inorganic fibrous porous body having a cell structure and comprising inorganic fibers other than asbestos, wherein
an average cell diameter is 260 μm or more and 1000 μm or less,
a bulk density is 0.0068 to 0.024 g/cm³,
a flow resistivity is 170,000 to 3,000,000 Ns/m⁴, and
the inorganic fibrous porous body comprises the inorganic fibers and one or more binders comprised of a coupling agent and optionally an inorganic binder, wherein the coupling agent is one or more of a silane coupling agent or a titanium coupling agent, wherein the inorganic fibers and one or more binders comprise a total amount of 95 wt % or more of the porous body, and wherein the coupling agent comprises 1 to 10 wt % of the porous body.

2. The soundproofing material according to claim 1, wherein the inorganic fibers are glass fibers.

3. The soundproofing material according to claim 1, further comprising a coating material coating at least a part of a surface of the porous body.

4. A soundproofing material which is an inorganic fibrous porous body, wherein
the inorganic fibrous porous body comprises inorganic fibers other than asbestos, and has a compressive stress when compressed at normal temperature at a compression ratio of 80% of 0.1 MPa or less and a recovery ratio when compressed at normal temperature at a compression ratio of 80% of 50% or more, and
the inorganic fibrous porous body comprises the inorganic fibers and one or more binders comprised of a coupling agent and optionally an inorganic binder, wherein the coupling agent is one or more of a silane coupling agent or a titanium coupling agent, wherein the inorganic fibers and one or more binders comprise a total amount of 98 wt % or more of the porous body, wherein the coupling agent comprises 1 to 10 wt % of the porous body, and wherein the one or more binders do not comprise clay minerals.

5. The soundproofing material according to claim 4, wherein an apparent Young's modulus of the porous body when compressed at normal temperature at a compression ratio of 80% is 1 MPa or less.

6. The soundproofing material according to claim 4, wherein a bulk density of the porous body at normal temperature is 0.005 to 0.1 g/cm³.

7. The soundproofing material according to claim 4, wherein a product [MPa·g/cm³] of a bulk density and a compressive stress of the porous body when compressed at normal temperature at a compression ratio of 40 to 80% is 0.3 or less.

8. A soundproofing material which is an inorganic fibrous porous body, wherein the inorganic fibrous porous body consists of inorganic fibers other than asbestos and a coupling agent, or consists of inorganic fibers other than asbestos, a surfactant and a coupling agent, wherein the coupling agent is one or more of a silane coupling agent or a titanium coupling agent, the inorganic fibers and the coupling agent comprise 98 wt % or more of the porous body, and the coupling agent comprises 1 to 10 wt % of the porous body, and all of recovery ratios of the porous body when compressed at normal temperature at each compression ratio in a range of compression ratio of 0 to 90% are 80% or more.

* * * * *